(12) United States Patent
Heuel et al.

(10) Patent No.: US 8,096,605 B2
(45) Date of Patent: Jan. 17, 2012

(54) SLIDING DOOR FOR A MOTOR VEHICLE

(75) Inventors: Gerhard Heuel, Olpe (DE); Reiner Schmidt, Minden (DE)

(73) Assignee: Dura Automotive Body & Glass Systems GmbH (DE)

( * ) Notice: Subject to any disclaimer, the term of this patent is extended or adjusted under 35 U.S.C. 154(b) by 333 days.

(21) Appl. No.: 12/028,286

(22) Filed: Feb. 8, 2008

(65) Prior Publication Data

US 2009/0200833 A1 Aug. 13, 2009

(30) Foreign Application Priority Data

Feb. 8, 2008 (DE) .................. 10 2007 006 360.3

(51) Int. Cl.
*B60J 5/06* (2006.01)

(52) U.S. Cl. ........................................ 296/155

(58) Field of Classification Search .................. 296/155, 296/146.1, 147, 146.4, 146.9, 146.11, 146.12; 49/209, 223, 260

See application file for complete search history.

(56) References Cited

U.S. PATENT DOCUMENTS

| | | | | |
|---|---|---|---|---|
| 3,006,683 A * | 10/1961 | Smith | ............................. | 49/248 |
| 3,095,600 A * | 7/1963 | Bretzner | ......................... | 16/224 |
| 3,158,395 A * | 11/1964 | Smith | ...................... | 296/146.12 |
| 3,758,990 A * | 9/1973 | Balanos | ......................... | 49/153 |
| 4,632,447 A * | 12/1986 | Nomura et al. | ................ | 296/153 |
| 4,641,881 A * | 2/1987 | Nomura et al. | ................ | 296/202 |
| 4,650,241 A * | 3/1987 | Motonami et al. | ........ | 296/203.03 |
| 6,183,039 B1 * | 2/2001 | Kohut et al. | ................... | 296/155 |
| 6,588,829 B2 * | 7/2003 | Long et al. | .................... | 296/155 |
| 6,793,268 B1 * | 9/2004 | Faubert et al. | ........... | 296/146.12 |
| 6,935,676 B2 * | 8/2005 | Plavetich | ................. | 296/146.11 |
| 7,178,853 B2 * | 2/2007 | Oxley et al. | .............. | 296/146.11 |
| 2003/0218358 A1 * | 11/2003 | Hahn | ............................. | 296/155 |

FOREIGN PATENT DOCUMENTS

WO   WO 2007004651 A1 *   1/2007

* cited by examiner

*Primary Examiner* — H Gutman

(74) *Attorney, Agent, or Firm* — Dean B. Watson; Kevin Mackenzie

(57) ABSTRACT

A sliding door for a vehicle such as a motor vehicle, on its inside has a guide rail which is mounted longitudinally displaceable in a slide. A hinge shackle is swivel mounted between the door and the vehicle. A state quantity of the vehicle is provided and the travel of the sliding door is established based on the state quantity.

18 Claims, 21 Drawing Sheets

SLIDING DOOR FOR A MOTOR VEHICLE

CROSS-REFERENCE TO RELATED APPLICATIONS

The present invention relates to, and is entitled to the benefit of the earlier filing date and priority of DE 10 2007 006 360.3-24, entitled "Sliding Door with Variable Approach Angle", filed Feb. 8, 2007, the disclosure of which is hereby incorporated herein by reference.

BACKGROUND OF THE INVENTION

I. Field of the Invention

The invention relates to a sliding door for a vehicle, more preferably for a motor vehicle wherein the sliding door has at its inner side a guide rail.

II. Description of the Background

Sliding doors for vehicles are generally known, see for example EP 1721768 A1. The object of the invention is to propose an improved sliding door for a vehicle.

SUMMARY OF THE INVENTION

Disclosed herein is a sliding door for a vehicle wherein a state quantity of the vehicle can be established. Opening of the sliding door takes place as a function of the state quantity established with alternative travel paths, such as parallel to the vehicle or at an angle to the vehicle. Through the invention the operational safety of the door or flexibility of design can be increased. To this end, a state quantity of the vehicle is established which represents the presence of an obstacle in the opening path of the sliding door. Opening of the sliding door is carried out in such a manner that the sliding door changes travel so that it does not collide with the obstacle.

It is possible that several state quantities of the vehicle can be established and that the opening of the sliding door can be changed as a function of one, several or all state quantities established.

Advantageous further developments are described generally in the Detailed Description of the Preferred Embodiments.

It is advantageous if one or several sensors are provided for establishing one or several or all state quantities of the vehicle.

According to an advantageous further development the wheel lock of the vehicle can be established. The locked steerable wheels of the vehicle can form an obstacle for the opening of the sliding door. Accordingly it is advantageous if the wheel lock of the steerable wheels of the vehicle can be established. More preferably the direction and/or the extent of the lock angle can be established.

More preferably an angle of rotation sensor is present for the drag link of the vehicle. From the angle of rotation established by the angle or rotation sensor for the drag link of the vehicle, the direction and/or the extent of the lock angle can be concluded.

Instead or additionally, two or more limit switches can be provided for the steering of the vehicle. The limit switches can register rotary positions of the drag link of the vehicle. However it is also possible that the limit switches register the positions of other components which are moved when the steering of the vehicle is actuated.

According to an advantageous further development the opening of the tank flap of the vehicle can be established. It is possible that certain positions or end positions of the opening of the tank flap can be established. Instead or additionally however the extent of the opening of the tank flap of the vehicle can also be established. Suitable sensors can be used for this purpose.

According to an advantageous further development the presence of a nozzle in the tank opening of the vehicle can be established.

It is advantageous if a motor for driving the guide rail is present. This can be an electric motor and/or a geared motor. The motor is preferentially provided on the slide. By way of the motor the guide rail can be driven relative to the slide.

It is advantageous if a motor for driving the hinge shackle is provided. The motor is preferentially provided on the vehicle or motor vehicle. This can be an electric motor and/or a geared motor. By way of the motor the hinge shackle can be swivelled.

An advantageous further development is characterized in that the sliding door can be arrested on the vehicle at the end facing away from the hinge shackle. Preferentially the sliding door can be arrested in the manner that length compensation and rotatability is made possible at the arresting point upon swivelling of the hinge shackle. This is preferentially achievable in that on the vehicle a hinge bolt for a hinge slideway is provided on the sliding door. The arrangement can also be made the other way round; then the hinge bolt is provided on the sliding door and the hinge slideway is provided on the vehicle. Preferentially it is an open hinge slideway which the hinge bolt can enter and which the hinge bolt can leave. Particularly suitable are U-shaped hinge slideways. The hinge bolt and the hinge slideway are preferentially arranged and matched to each other in such a manner that they guide the sliding door into the closing position.

On the hinge slideway there is preferentially a switch such as a micro-switch. The switch is preferentially located near the end of the hinge slideway, that is in the vicinity of the point at which the hinge bolt leaves the hinge slideway or enters the hinge slideway. Through the switch, the point at which a longitudinal movement of the sliding door is to commence, can be registered. A further advantageous development is characterized in that on the hinge shackle a deflection arm with a guide pin is provided, which is guided in a deflection guide provided on the sliding door.

Preferentially a lock guide branches off the deflection guide. The branch-off point of the lock guide of the deflection guide can preferentially be closed through a lock pawl. It is advantageous if the lock pawl is swivel-mounted. Preferentially the lock pawl is a part of the lock guide.

In the lock guide a locking lug for the guide pin can be provided. The lock pawl is preferentially spring-loaded. It is advantageous if the lock pawl can be locked, preferentially through a locking bolt.

Furthermore, there is disclosed herein a sliding door for a vehicle including: a door; a slide; a guide rail longitudinally displaced about the door and adapted to receive the slide; a vehicle mount; a hinge shackle swivel mounted between the slide and the vehicle mount; a state quantity of the vehicle, the door having more than one travel path, wherein the travel path is based on the state quantity of the vehicle.

Also disclosed herein is a method for the opening of a sliding door of a vehicle on its inner side with a guide rail that is mounted longitudinally displaceable in a slide, wherein a hinge shackle is swivel-mounted on the vehicle and the hinge shackle is swivel-mounted on the slide, a state quantity of the vehicle is established and the opening of the sliding door is changed as a function of the state quantity established.

It is advantageous if the sliding door comprises one or several or all of the advantageous developments described.

An exemplary embodiment of the invention is explained in detail in the following by means of the enclosed drawing.

DETAILED DESCRIPTION OF THE PREFERRED EMBODIMENTS

Figure 1:
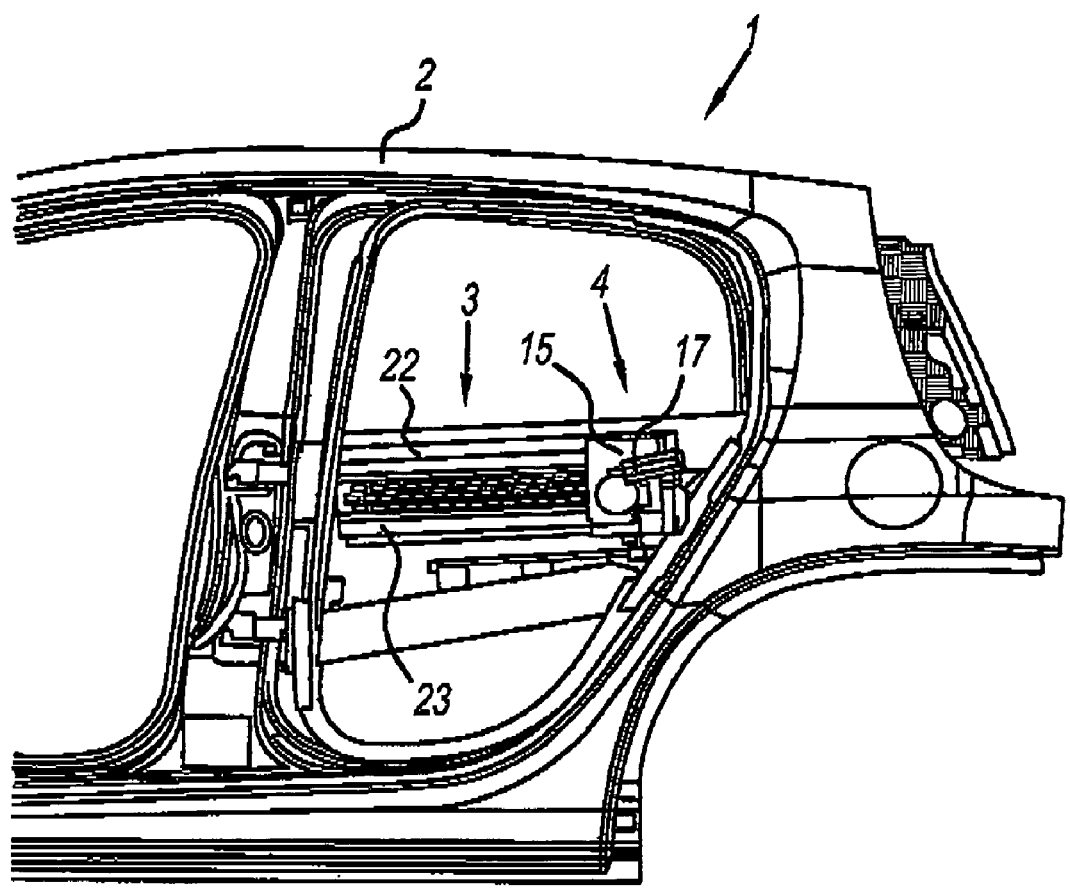
FIG. 1 is a lateral view of a part of a body of a motor vehicle.
Figure 2:
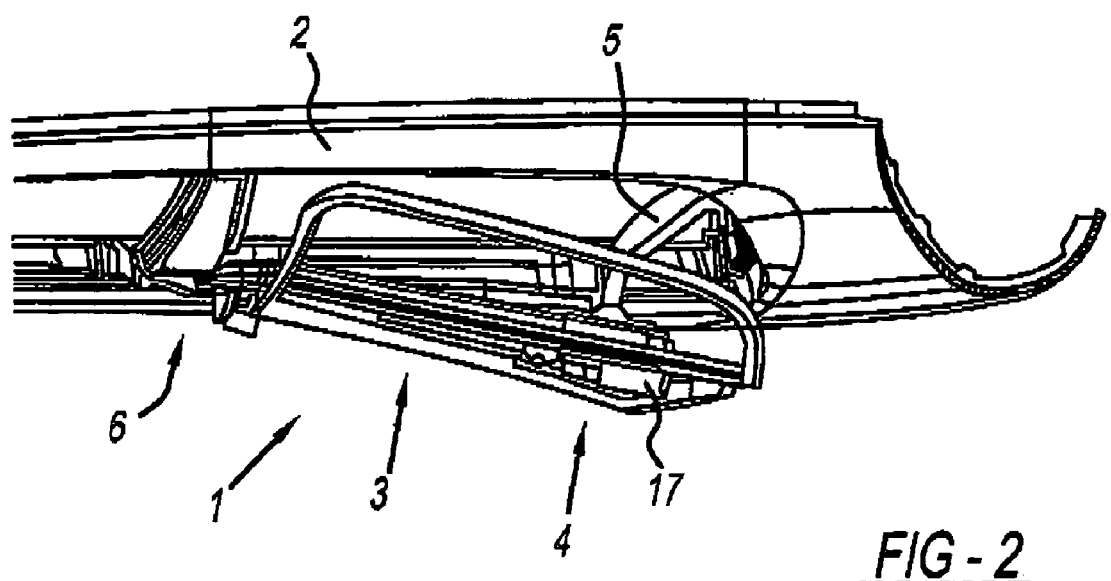
FIG. 2 is a view from the top of the body according to FIG. 1.

FIGS. 1 and 2 show a sliding door 1 which is partially opened relative to the body 2 of a motor vehicle. On its inner side the sliding door 1 comprises a guide rail 3 which is mounted longitudinally displaceable in a slide 4.

A hinge shackle 5 is swivel-mounted on the body 2. On the other end of the hinge shackle 5 the slide 4 is swivel-mounted.

On opening the sliding door 1, said sliding door is initially swiveled from the closed position (not shown in the drawing) into the partially opened position, which is shown in FIGS. 1 and 2. This takes place through swiveling of the hinge shackle 5. To make possible this swivel movement, a U-shaped hinge slideway 6 is provided at the end of the sliding door 1 situated opposite the hinge shackle 5 that is in the exemplary embodiment shown at the front end of the sliding door 1. The U-shaped hinge slideway 6 substantially runs parallel to the vehicle longitudinal direction. At its end facing away from the hinge shackle 5, that is the front end in the exemplary embodiment, it is open. A hinge bolt 7, which projects substantially vertically upwards, engages in the U-shaped hinge slideway 6. Through the hinge bolt 7 and the hinge slideway 6 the sliding doorl can be arrested on the vehicle at the end facing away from the hinge shackle 5.

When the sliding door 1 is completely closed, the hinge bolt 7 is positioned within the U-shaped hinge slideway 6, specifically at a distance from the end of said slideway. During the opening movement generated through swivelling of the hinge shackle 5 the sliding door 1 swivels about the hinge bolt 7. In the process, the U-shaped hinge slideway 6 slides, relative to the hinge bolt 7, away from said bolt. In the position of the sliding door 1 shown in FIGS. 1 and 2 in which the sliding door 1 is set to, the hinge bolt 7 is located at the open end of the U-shaped hinge slideway 6.

During the closing movement the sliding door 1 is positioned in such a manner that the open end of the U-shaped hinge slideway 6 accommodates the hinge bolt 7. As a result, the closing movement of the sliding door 1 as far as the completely closed position is made possible.

Figure 4:
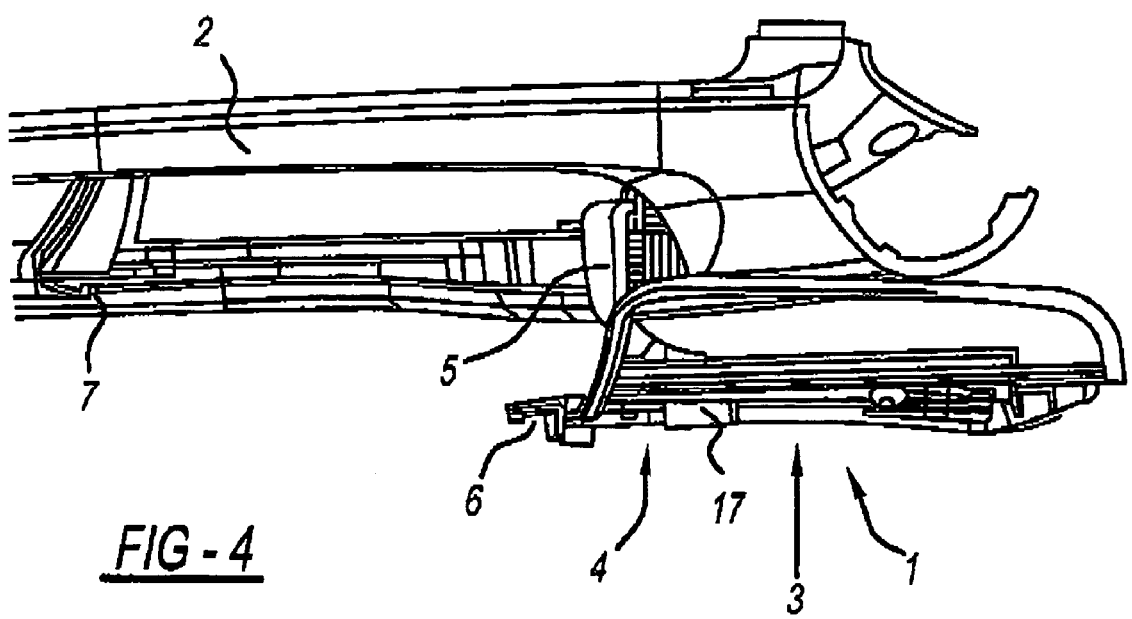
FIG. 4 is a view from the top of the sliding door according to FIG. 3.
Figure 5:
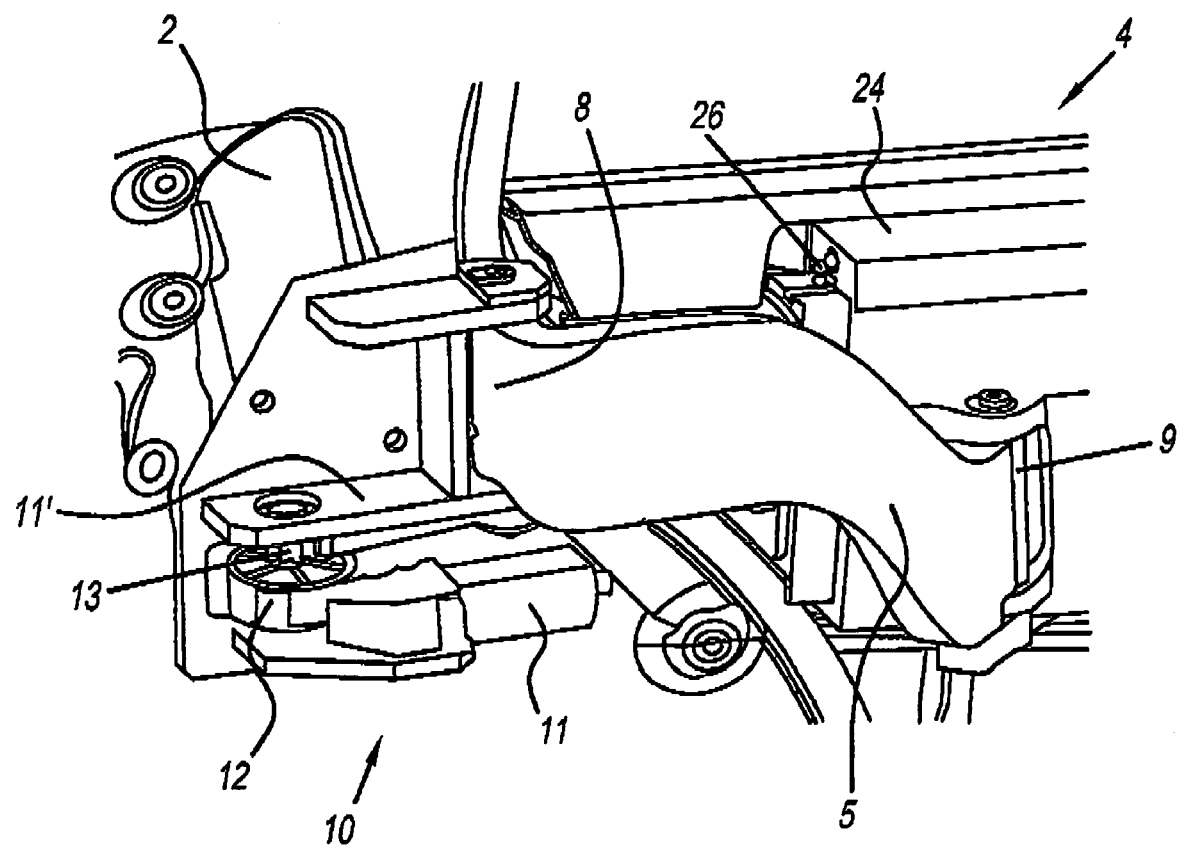
FIG. 5 is a perspective view of the hinge shackle and the components associated with said shackle.
Figure 6:
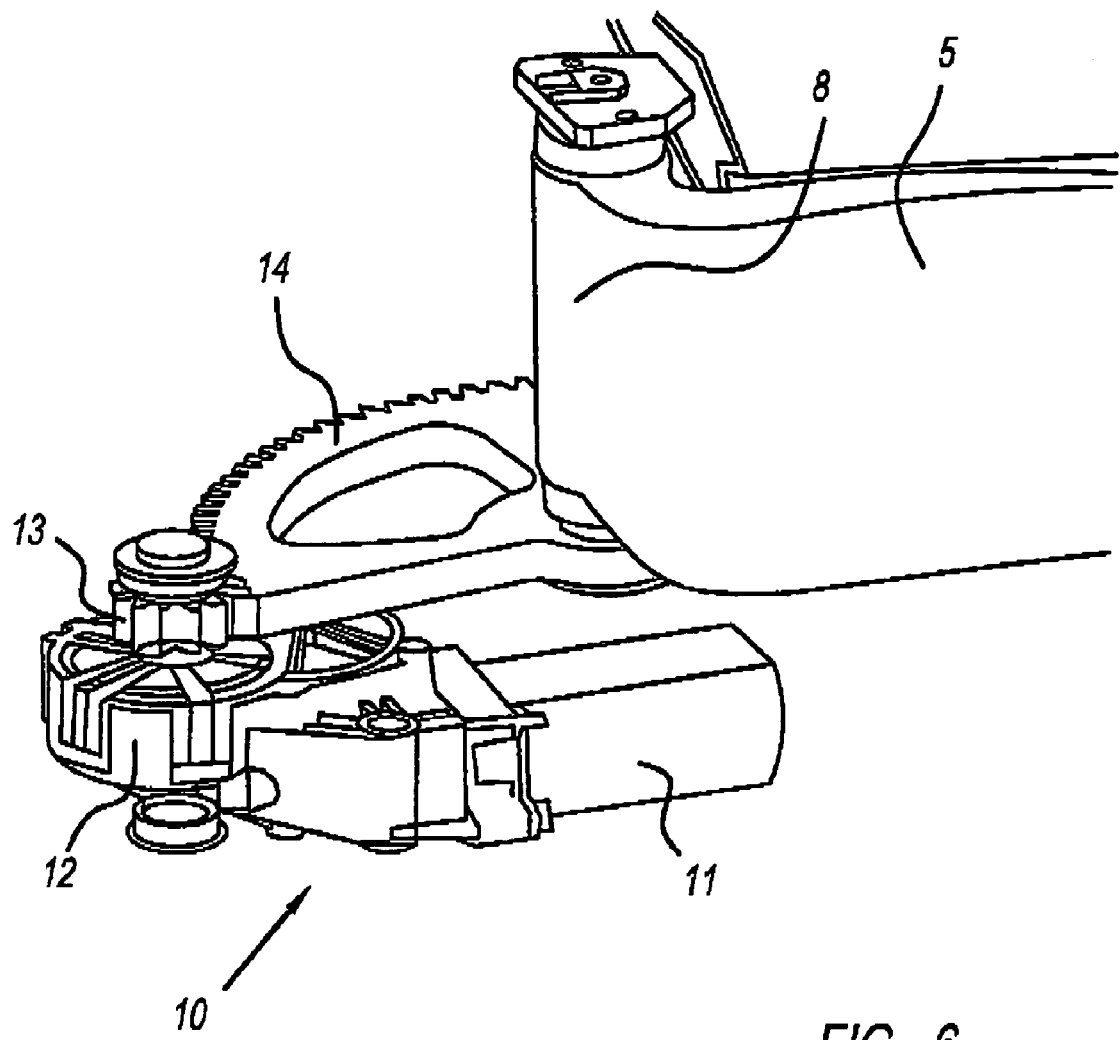
FIG. 6 is a perspective view of the components according to FIG. 5, however without some body components, FIG. 7 a perspective view of the slide and the components associated with said slide.

FIGS. 5 and 6 show the hinge shackle 5 and the parts surrounding it in an enlarged view. On a part of the body 2, the hinge shackle 5 is swivel-mounted about an axis substantially oriented vertically. At its other end it is likewise swivel-mounted about a substantially vertically oriented axis 9 on the slide 4. The hinge shackle 5 comprises a centre part, which in the view from the top (FIGS. 2 and 4) is oriented substantially straight or level but which, as is more preferably visible from FIG. 5, runs downwards at a slope in the direction from the body 2 to the slide 4. From the centre part of the hinge shackle 5, two end parts, at whose ends the axes 8, 9 are located, veer off in the view from the top (FIGS. 2 and 4), wherein the end facing the axis 8 veers off by an angle of approximately 90 degree and the end facing the axis 9 veers off by an angle of approximately 45 degree, so that the end parts stand at an angle of approximately 135 degree relative to each other.

A geared motor 10 which is fastened to an angle plate 11' on the C-pillar of the body 2 serves to swivel-drive the hinge shackle 5. The geared motor 10 comprises an electric motor 11 driving a gear 12, whose vertically oriented output shaft carries a gear 13 that can be driven by the geared motor 10.

Compared with the view in FIG. 5 the angle plate 11' has been omitted in FIG. 6. As is visible from FIG. 6 the gear 13 meshes with a gear 14 which is provided on the swivel arm 5. The gear 14 is swivel-mounted about the axis 8. It is joined to the swivel arm 5 in a rotationally fixed manner. Since the swivel arm 5 only has to perform a rotation by approximately 90 degree the gear 14 likewise only extends over an angular range of substantially 90 degree.

Figure 7:
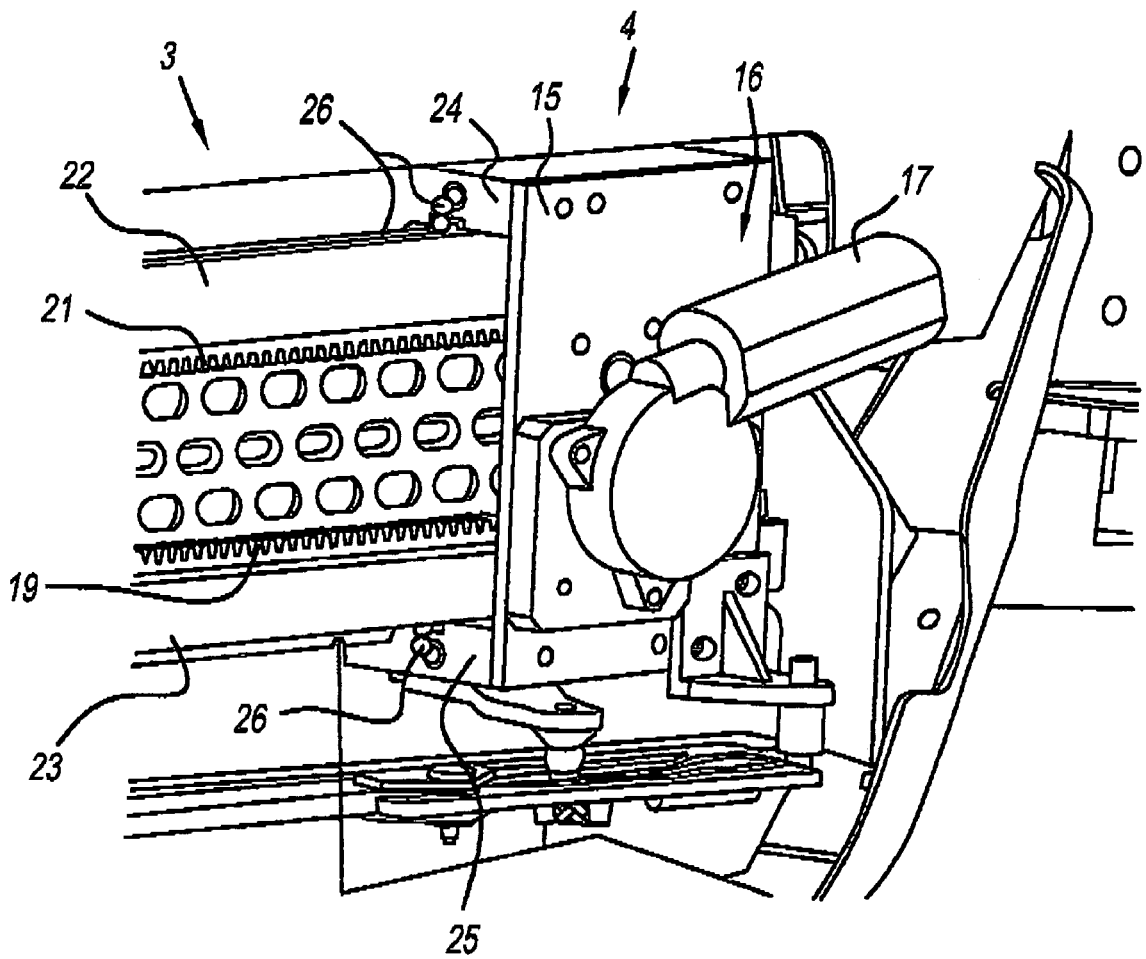

As is visible from FIG. 7, a geared motor 16 is fastened to a connecting plate 15 of the slide 4 which is substantially oriented vertically, which geared motor serves to drive the guide rail 3. The geared motor 16 comprises an electric motor 17 whose output shaft which is substantially oriented horizontally and parallel to the guide rail 3 carries a worm gear which drives a gear whose axis of rotation is substantially oriented horizontally and transversely to the guide rail 3.

Figure 8:
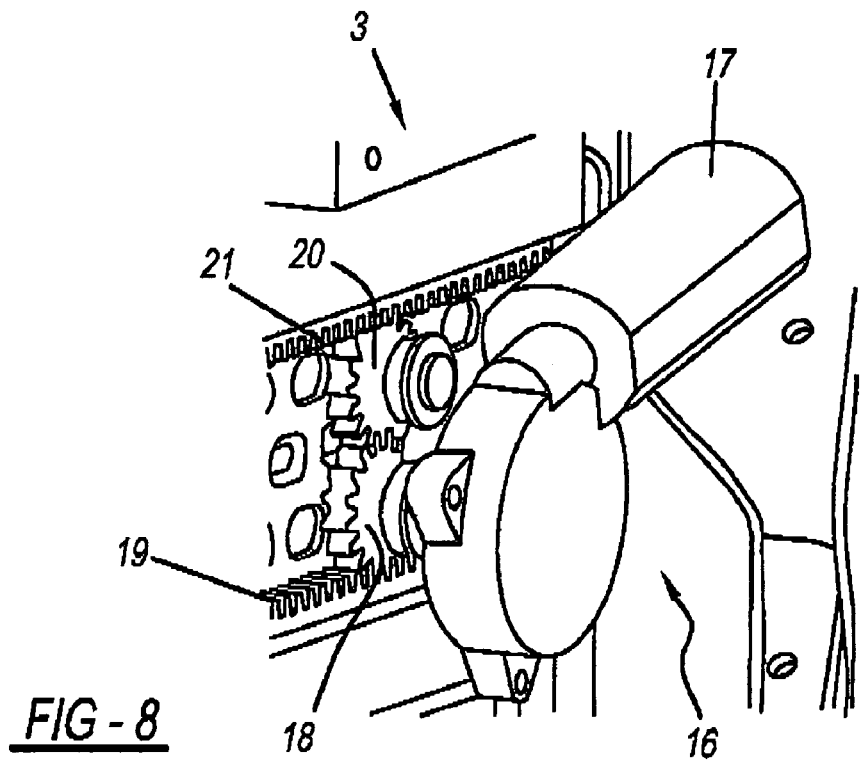
FIG. 8 is a view of the components according to FIG. 7, however without some parts of the slide.

This gear is joined with a gear 18, visible in FIG. 8, since the connecting plate 15 of the slide 4 was omitted there. The gear 18 meshes with a rack 19 provided on the sliding door 1. The rack 19 runs parallel to the guide rail 3.

The gear 18 driven by the geared motor 16 further meshes with a further gear 20, which in turn meshes with a further rack 21. The driven gear 20 has the same diameter and the same number of teeth as the driving gear 18. It is rotatably mounted on the slide 4 about an axis which is parallel to and spaced from the axis of the driving gear 18. The further rack 21 runs parallel to and spaced from the first rack 19. The rotary movement introduced into the driving gear 18 by the geared motor 16 causes the driven gear 20 to perform a counter-rotating movement. The counter-rotations of the gears 18, 20 through the support on the racks 19, 21 result in a linear movement of the guide rail 3 relative to the slide 4.

As is visible from FIG. 7, the guide rail 3 comprises an upper guide strip 22 and a lower guide strip 23 whose outer ends are embraced from the top by guide blocks 24, 25 of the slide 4. Sliding guidance of the guide strips 22, 23 in the guide blocks 24, 25 is by way of anti-friction bearings 26.

Figure 3:
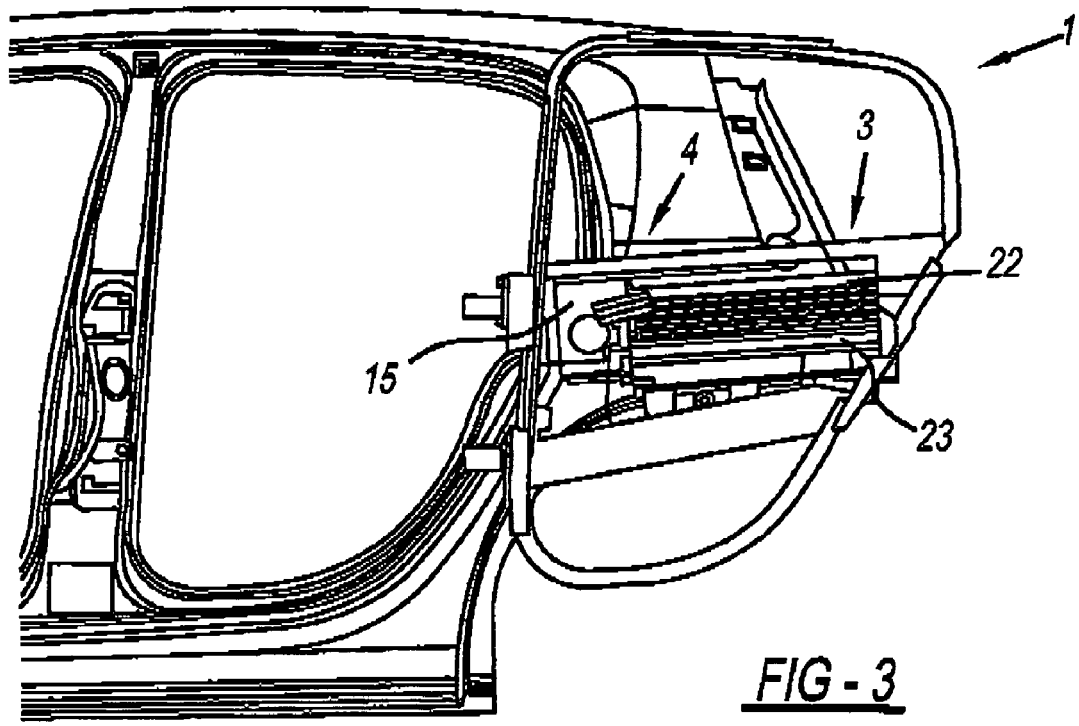
FIG. 3 is a lateral view of the sliding door according to FIGS. 1 and 2 in the open state.

Through the invention, an electromechanical drive system for a sliding door of a vehicle, more preferably a motor vehicle is created which can comprise two drive units each of which can take over different functions. A first drive unit is realized by the geared motor 10 and the components associated with said motor. This drive unit takes over the first opening movement of the sliding door 1, i.e. "the setting to" of the sliding door 1 as for example is shown in FIGS. 1 and 2. A second drive unit is formed by the geared motor 16 and the components associated with said motor. This drive unit takes over the "linear movement" of the sliding door 2 as far as the completely opened position, which is shown in FIGS. 3 and 4, and back again. The first drive unit and the second drive unit can be connected with one another electromechanically in such a manner that this produces an opening movement and the opposing closing movement.

FIG. 9 to 19 shows the movement sequence during opening and closing of the sliding door 1. A deflection arm 27, which at its end comprises a guide pin 28, is provided on the hinge shackle 5. The deflection arm 27 forms an extension of the end parts of the hinge shackle 5 facing the axis 9.

The guide pin 28 comprises a calotte which is guided in a deflection guide 29 and in a lock guide 30. The deflection guide 29 is provided in a guide plate 31 which is connected with the sliding door 1. It substantially extends in vehicle longitudinal direction.

The lock guide 30 branches off from the deflection guide 29. The branch-off point 32 is located at the rear end of the deflection guide 29. The lock guide 30 runs at an acute angle to the deflection guide 29.

Figure 9:
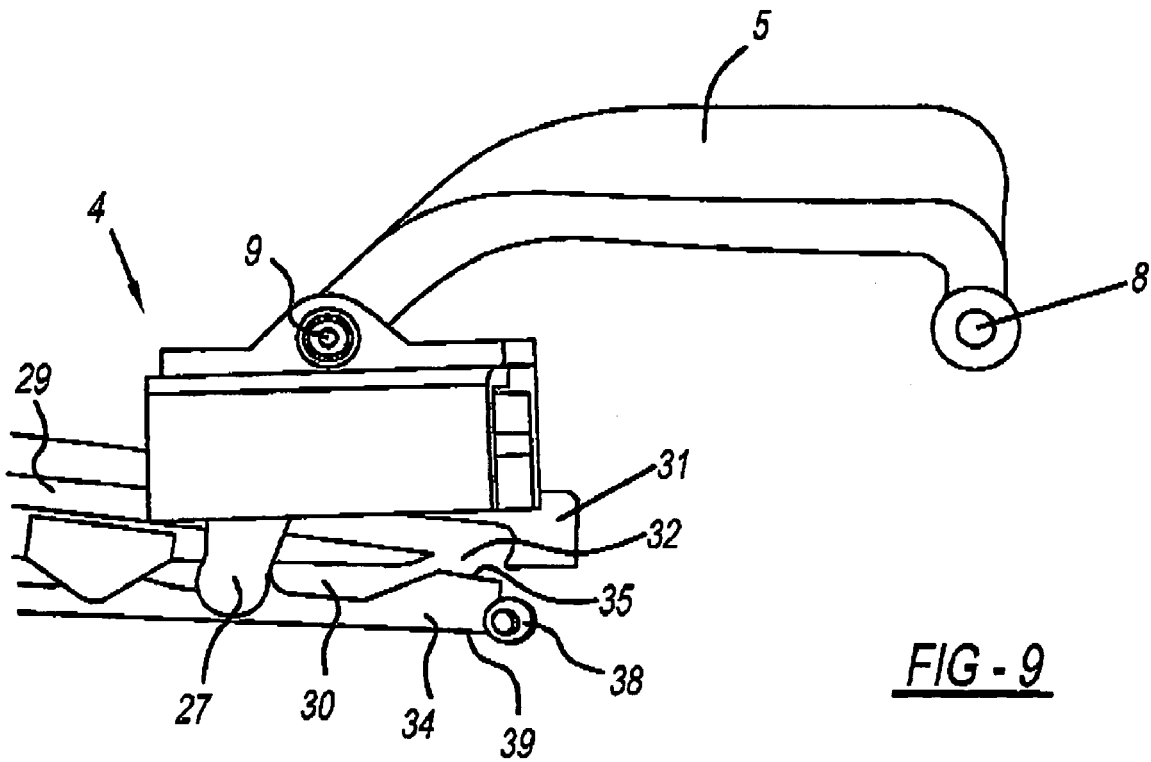
FIG. 9 is a view from the top with the sliding door closed.
Figure 10:
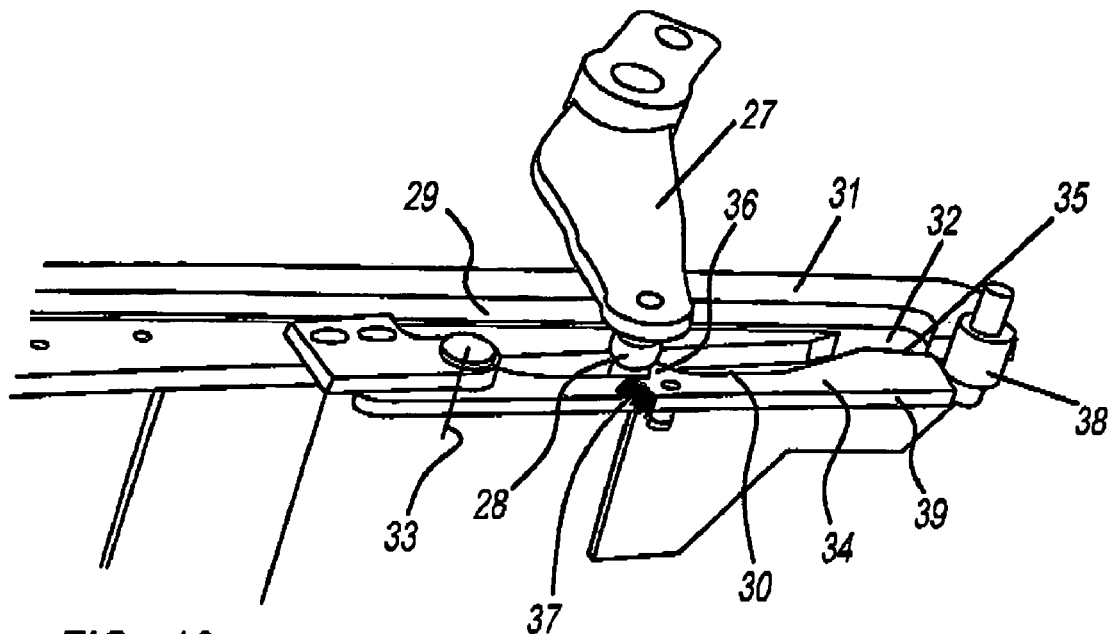
FIG. 10 is a perspective view corresponding to FIG. 9.

At the front end of the lock guide 30 a vertical swivel axis 33 is provided which can be formed by a bolt and about which a lock pawl 34 is swivel-mounted. The branch-off point 32 of the lock guide 30 of the deflection guide 29 can be locked by the lock pawl 34. To this end, the lock pawl 34 at its end facing away from the swivel axis 33 comprises a closing section 35 facing the branch-off point 32. When the lock pawl is located in its inner end position, in which it is swivelled about the swivel axis 33 in anticlockwise direction and which is shown in FIG. 11 to 15, the branch-off point 32 is closed so that the lock guide 30 is not accessible to the guide pin 28. When the lock pawl 34 is located in its outer end position, in which it is swivelled about the swivel axis 33 in clockwise direction and which is shown in FIGS. 9 and 10, the branch-off point 32 is opened so that the lock guide 30 is accessible to the guide pin 28.

The lock pawl 34 forms a part of the lock guide 30. As is evident from FIG. 9 to 15 the inner side of the lock pawl 34 forms the outer side of the lock guide 30. The inner side of the lock guide 30 is formed by an outer side of the guide plate 31.

A locking lug 36 for the guide pin 28 is provided in the lock guide 30. The locking lug 36 is located approximately in the centre of the lock guide 30. It is provided on the lock pawl 34. Its flank facing the swivel axis 33 forms an angle of substantially 90 degree with the lock guide 30. Its flank facing away from the swivel axis 33 forms an angle of approximately 45 degree with the lock guide 30. The lock pawl 34 is preloaded by a return spring 37, which is designed as tension spring and which on the one hand is fastened to the guide plate 31 and on the other hand to the lock pawl 34, specifically below these components. Through the return spring 37 the lock pawl 34 is preloaded in a counter clockwise direction about the swivel axis 33, i.e. in the direction in which the lock pawl 34 closes the branch-off point 32.

Figure 11:
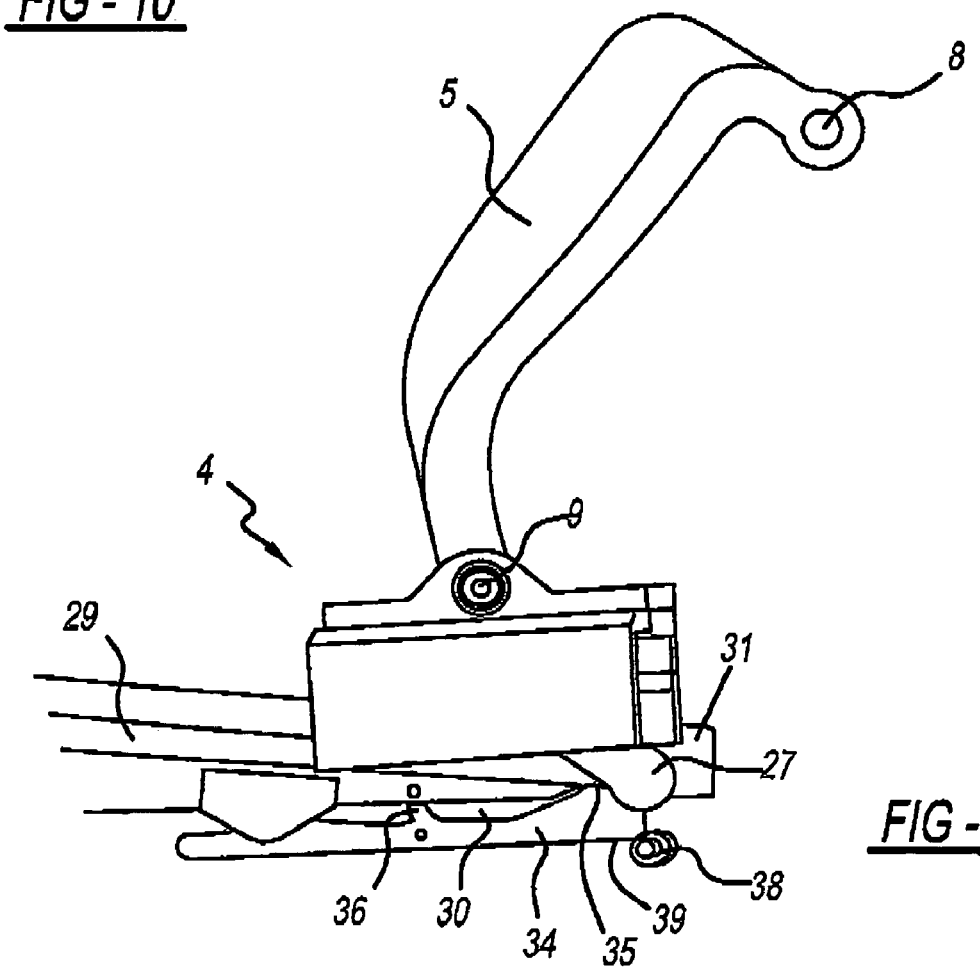
FIG. 11 is a view from the top of the hinge arm and the deflection guide with the sliding door.
Figure 12:
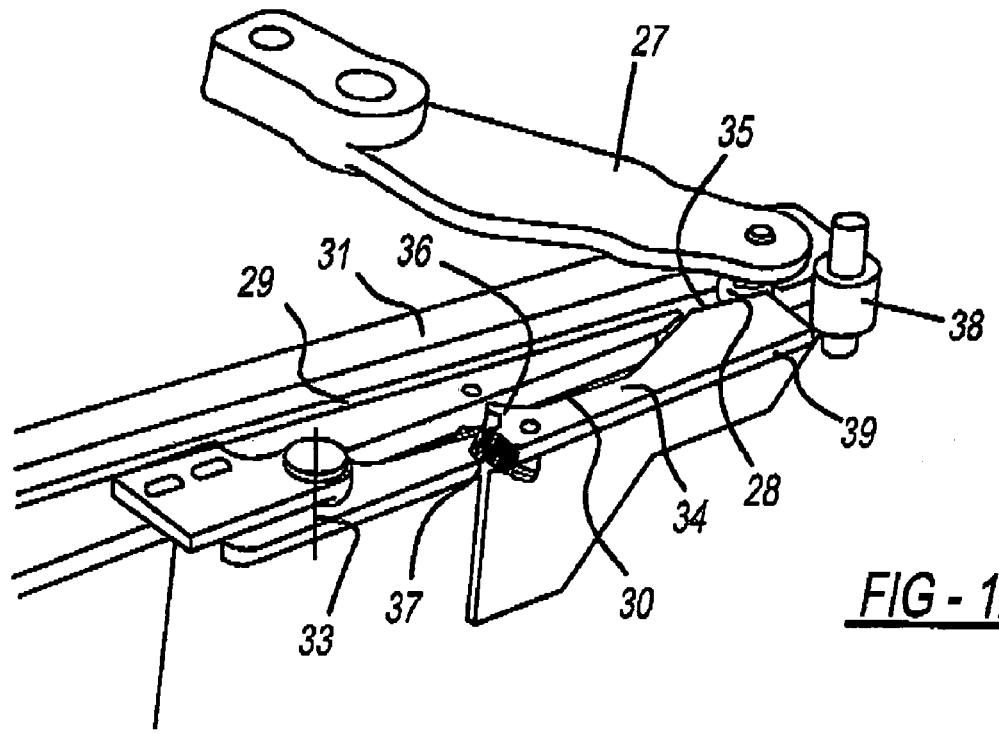
FIG. 12 is a perspective view of the deflection arm and the deflection guide with the sliding door.
Figure 13:
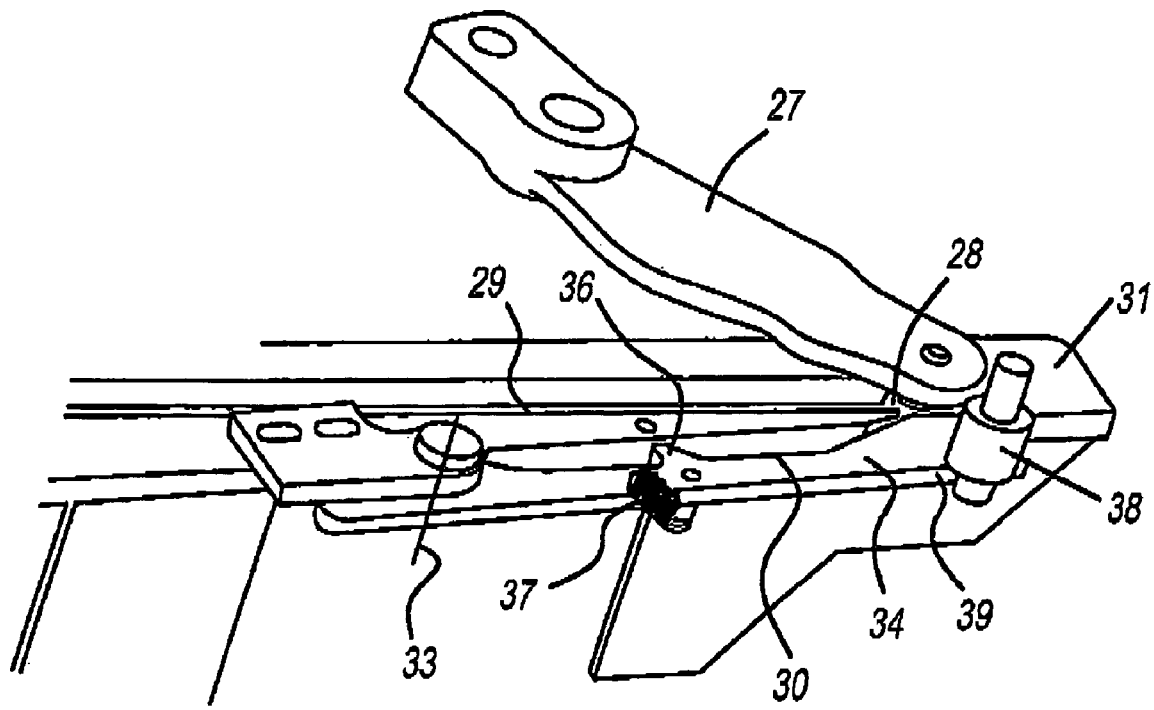
FIG. 13 is a view corresponding to FIG. 12 in an intermediate position of the sliding door.
Figure 14:
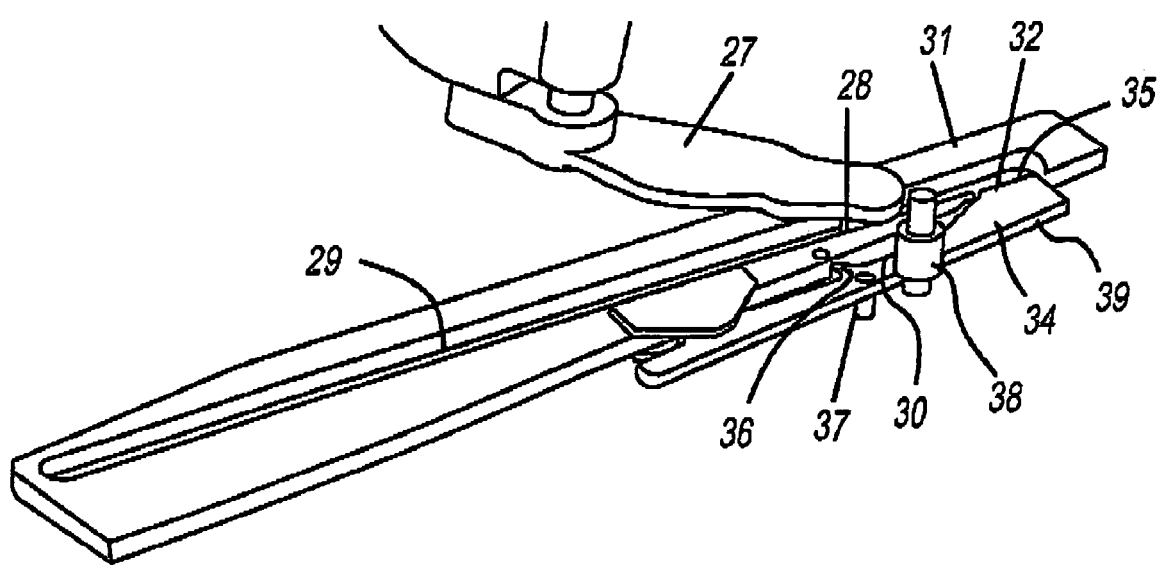
FIG. 14 is a view corresponding to FIGS. 12 and 13 with a further advanced intermediate position of the sliding door.

The lock pawl 34 can be locked. To this end, a locking bolt 38 is provided on the slide 4 which is located on the outer section 39 of the lock pawl 34 positioned opposite the locking section 35, when the sliding door assumes an intermediate position, as shown in FIGS. 13 and 14. In this position, clockwise swivelling of the lock pawl 34 about the swivel axis 33, i.e. in a direction for opening the branch-off point 32 is prevented through the locking bolt 38, so that the branch-off point 32 remains closed. When the sliding door 1 is closed or set to, as shown in FIG. 9 to 12, the locking bolt 38 is not located on the outer section 39 of the lock pawl 34 positioned opposite the closing section 35, so that the lock pawl 34 can be swivelled clockwise about the swivel axis 33 and the branch-off point 32 can thus be opened.

When the sliding door 1 is closed, the deflection arm 27 assumes the position shown in FIG. 9, in which its guide pin 28 rests against the flank of the locking lug 36 facing the swivel axis 33. Since this flank runs at an angle of approximately 90 degree to the lock guide it is subject to self-retention so that the sliding door 1 is arrested in this position.

For opening the sliding door 1 the lock pawl 34 is swivelled clockwise about the swivel axis 33 until it assumes the position shown in FIG. 10. This swivelling can take place manually, for example by actuating an opening lever or opening handle. However it can also take place with motor power, namely through a relay, an electric motor, a solenoid switch or another actuator (not shown in the drawing). When the lock pawl 34 is in the position shown in FIG. 10 the hinge shackle 5 can be swivelled. This causes the guide pin 28 to slide past the locking lug 36 in the lock guide 30 further to the back. The locking bolt 38 continues not to be present on the section 39 of the lock pawl 34 which is opposite the locking section 35, so that the guide pin 28 is able to traverse the additional path in the lock guide 30 to the back.

On this path the guide pin 28 traverses the branch-off point 32. It reaches the back end of the deflection guide 29, as shown in FIGS. 11 and 12. The hinge shackle 5 has now been swivelled to the extent that the sliding door 1 is set to as shown in FIG. 2. In this position the branch-off point 32 is closed since the return spring 37 has swivelled the lock pawl 34 counter clockwise about the swivel axis 33.

Following this, the guide rail 3 is driven a short distance relative to the slide 4. As a result, the locking bolt 38 reaches the outer section 39 of the lock bolt 34 located opposite the lock section 35 so that the lock pawl 34 is locked in its position locking the branch-off point 32 as shown in FIG. 13. The locking bolt is now guided in the deflection guide 29.

Following this, the hinge shackle 5 is swivelled further, which causes the front end of the sliding door 1 to be swivelled away from the body 2. After this, the guide rail 3 is driven so that the sliding door 1 is pushed to the back. During these movements the sliding door 1 is guided by the guide pin 28 sliding through the deflection guide 29. The deflection guide 29 is embodied in such a manner that the sliding door 1 is moved to the back substantially parallel to the body 2. To this end the deflection guide 29 can have a substantially straight-line course, as is more preferably evident from FIGS. 14 and 15. It can however also be curved or comprise curved sections.

Figure 15:
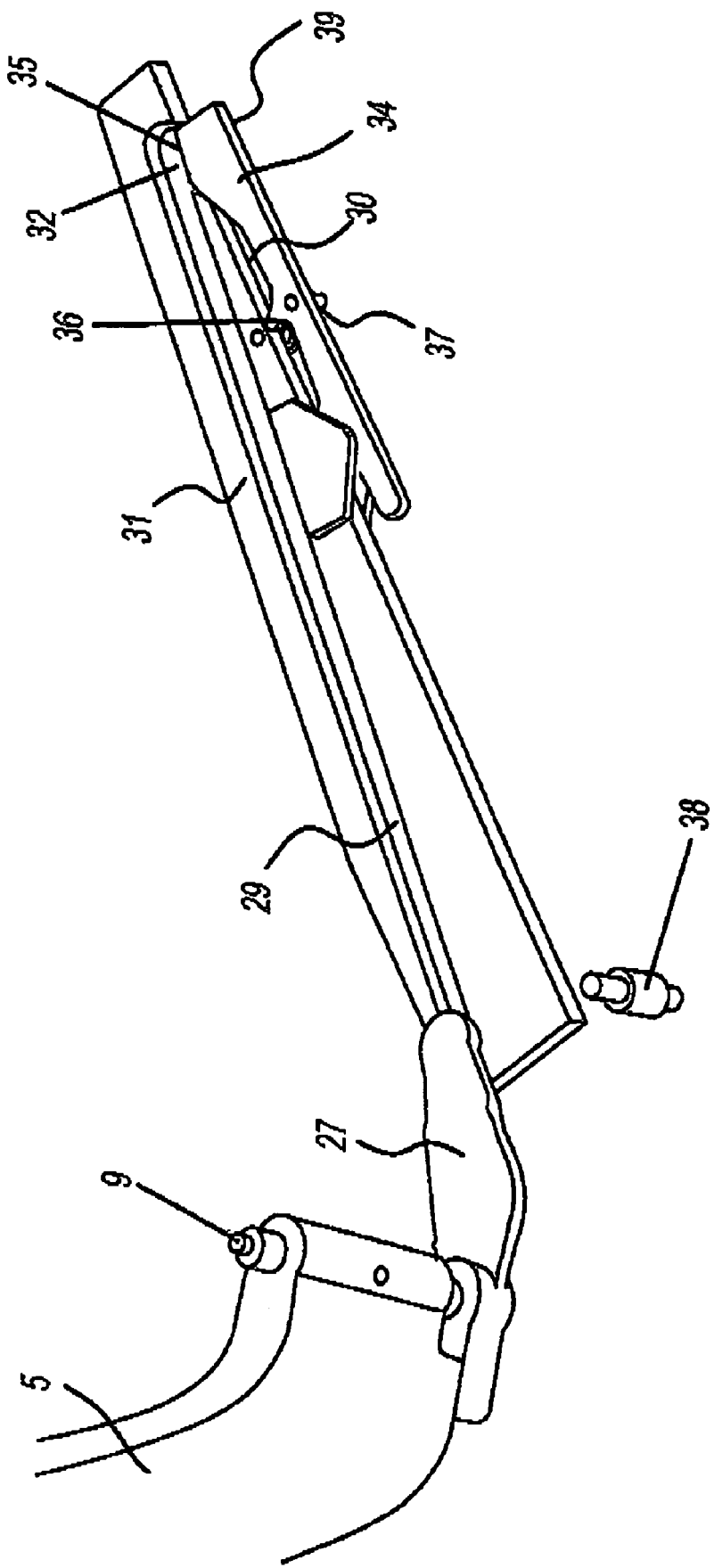
FIG. 15 is a view corresponding to FIG. 12 to 14 with the sliding door open.

When the guide pin 28 has arrived at the front end of the deflection guide 29 the sliding door 1 is fully open as shown in FIG. 15.

The reverse path is traversed on closing the sliding door 1. The guide pin 28 moves in the deflection guide 29 from the position shown in FIG. 15 via the intermediate position shown in FIG. 14 as far as approximately to the rear end of the deflection guide 29, as shown in FIG. 13. Following this the guide rail 3 is repositioned a short distance until the locking bolt 38 exposes the section 39 of the lock pawl 34 located opposite the closing section 35 as shown in FIG. 12. After this, the hinge shackle 5 is swivelled. This causes the lock guide 30 to be opened. This takes place through pressing of the guide pin 28 onto the closing section 35 so that the lock pawl 34 is swivelled clockwise about the swivel axis 33 against the force of the return spring 37. This causes the branch-off point 32 to be opened and the guide pin 28 arrives in the lock guide 30.

Following this the guide pin 28 comes to bear against the flank of the lock bolt 36 facing away from the swivel axis 33 so that the lock pawl 34 is further pushed open until the guide pin 28 has passed the lock pawl 36. In this position the lock pawl 34 is again pulled closed by the return spring 37, i.e. swivelled counter clockwise about the swivel axis 33 so that the blocked position according to FIG. 9 is reached, in which the sliding door 1 is closed and locked.

FIG. 16 to 19 show the sliding door 1 in a view from the top, wherein however it is not a left rear sliding door of a motor vehicle as in FIG. 1 to 5, but a left front sliding door of the motor vehicle that can be opened towards the front.

Figure 16:
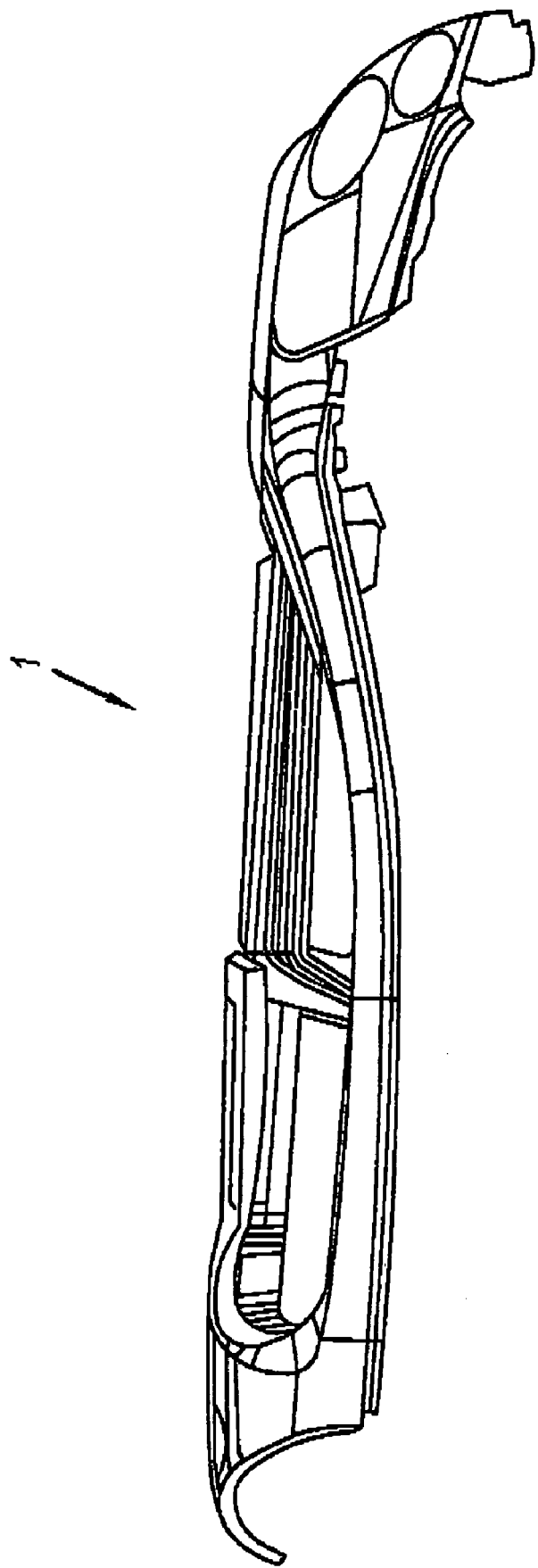
FIG. 16 is a view from the top, left side of a motor vehicle with the sliding door closed, FIG. 17 a view from the top, left side of the motor vehicle according to FIG. 16 with the sliding door partially opened.
Figure 17:
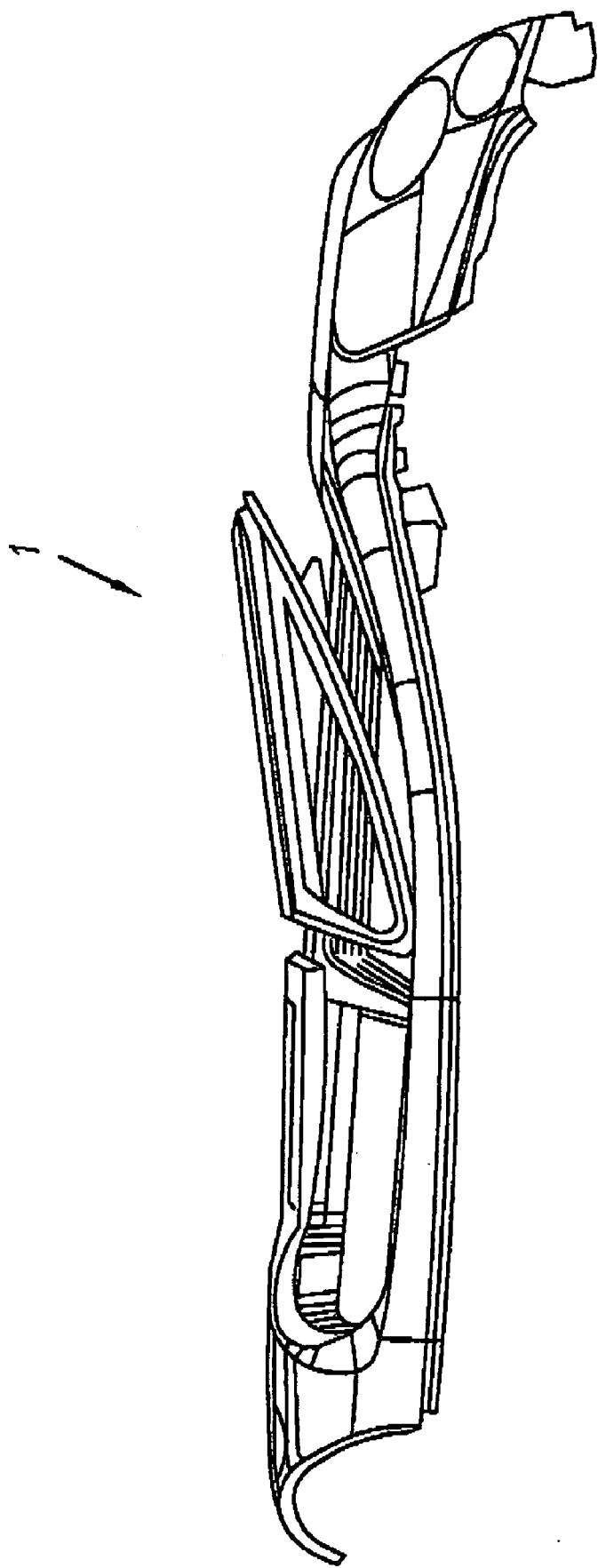
Figure 18:
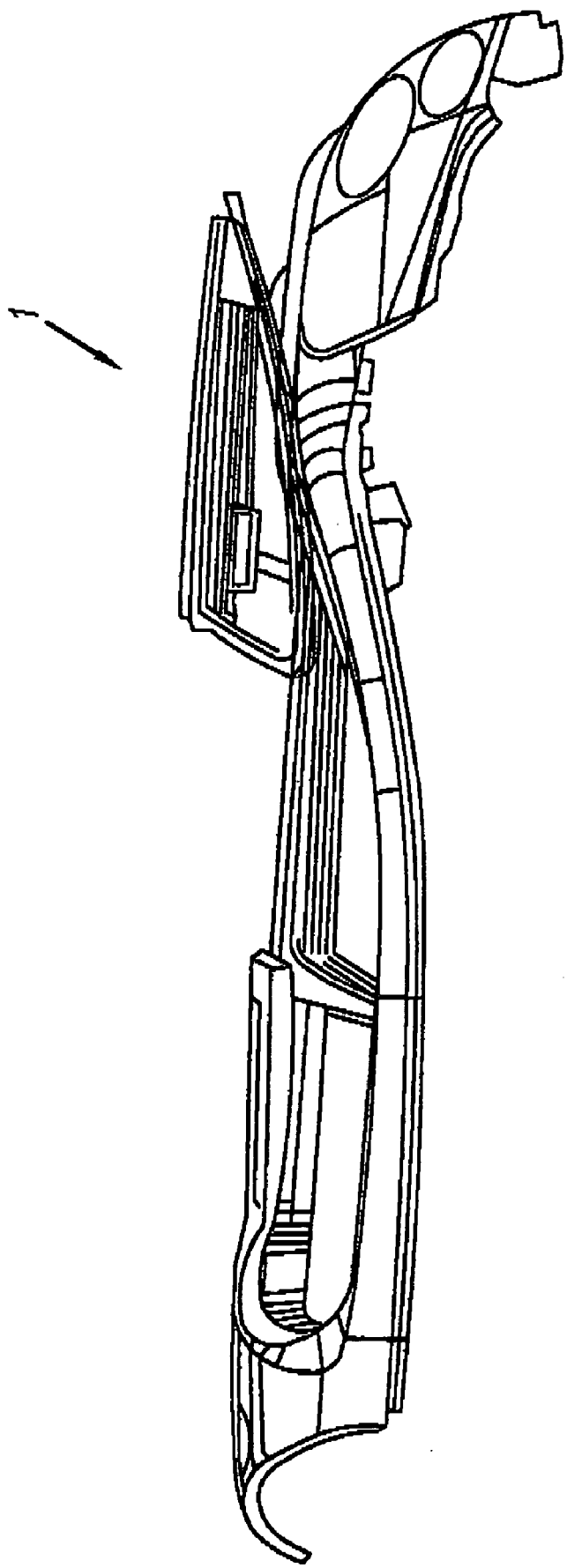
FIG. 18 is a view from the top, left side of the motor vehicle according to FIGS. 16 and 17 with a opened sliding door.

As is evident from FIG. 16 to 18 the normal opening movement of the sliding door 1 is designed in such a manner that this sliding door 1, from the closed position shown in FIG. 16, is initially set at an angle and to a minor extent displaced forward in longitudinal direction as shown in FIG. 17, until the completely opened position according to FIG. 18 is reached, in which the sliding door assumes a position which is substantially parallel to the starting position or to the vehicle longitudinal axis.

Figure 19:
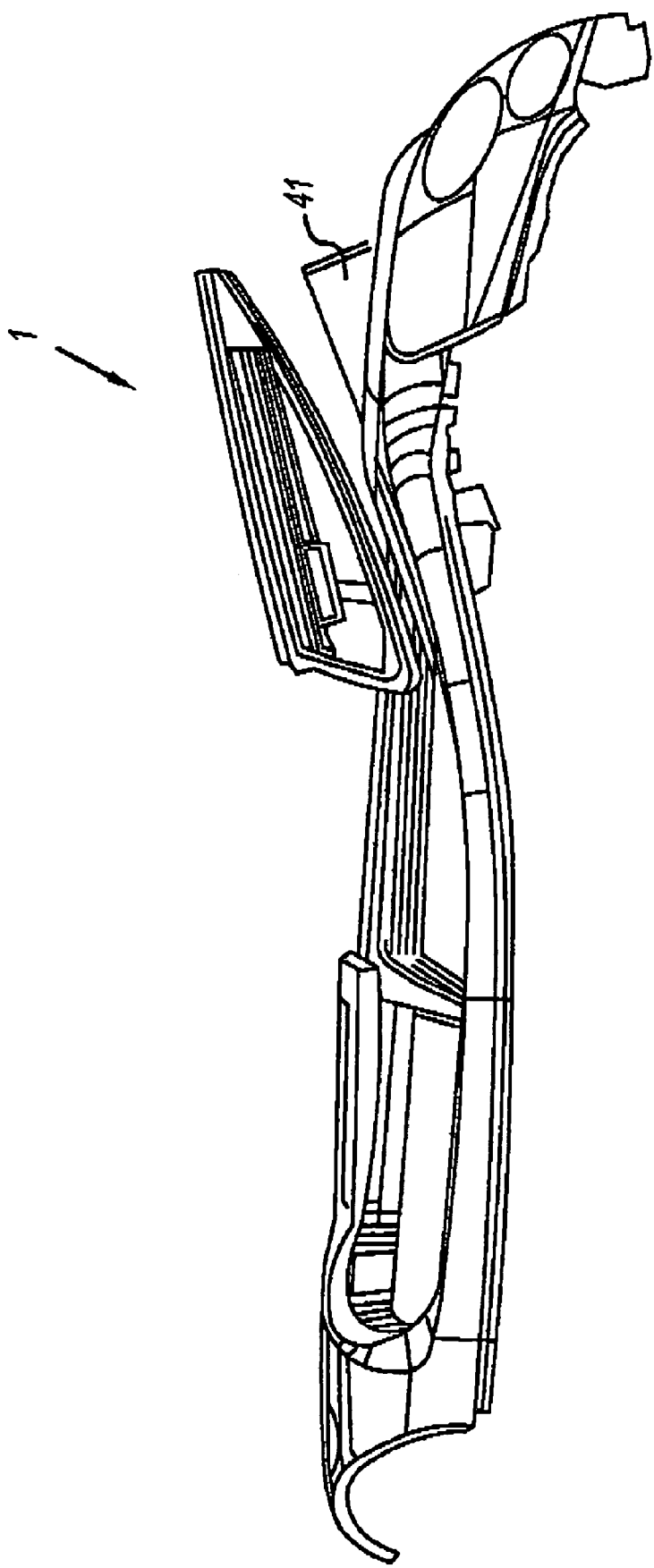
FIG. 19 is a view from the top, left side of the motor vehicle according to FIGS. 16 to 18 with front wheels locked to the left and an opened sliding door along an alternative travel path.
Figure 20:
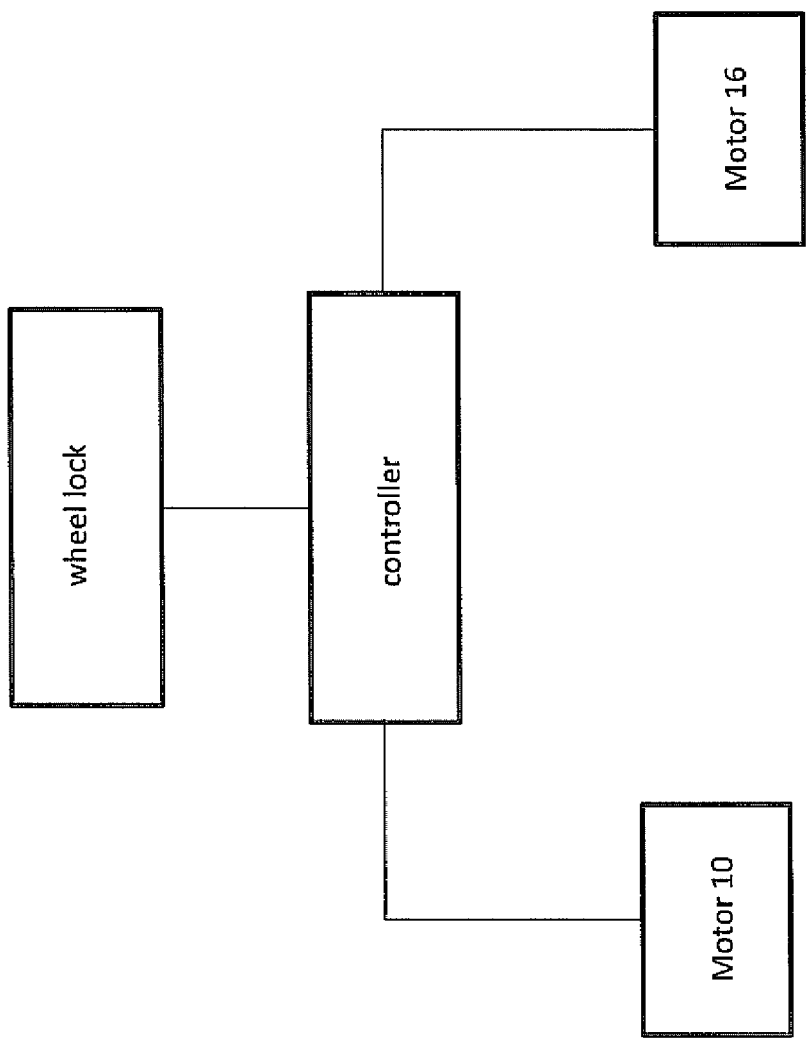
FIG. 20 is a diagram illustrating the wheel lock connected to a controller controlling the sliding door motors.
Figure 21:
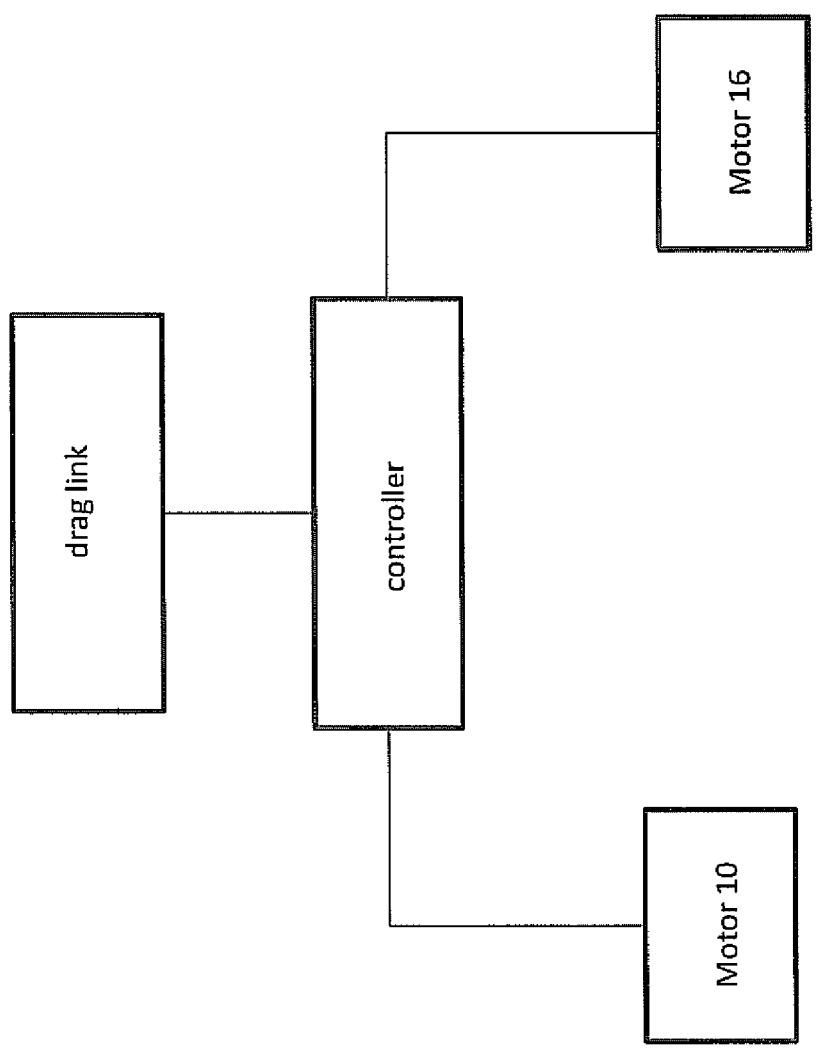
FIG. 21 is a diagram illustrating the drag link connected to a controller controlling the sliding door motors.
Figure 22:
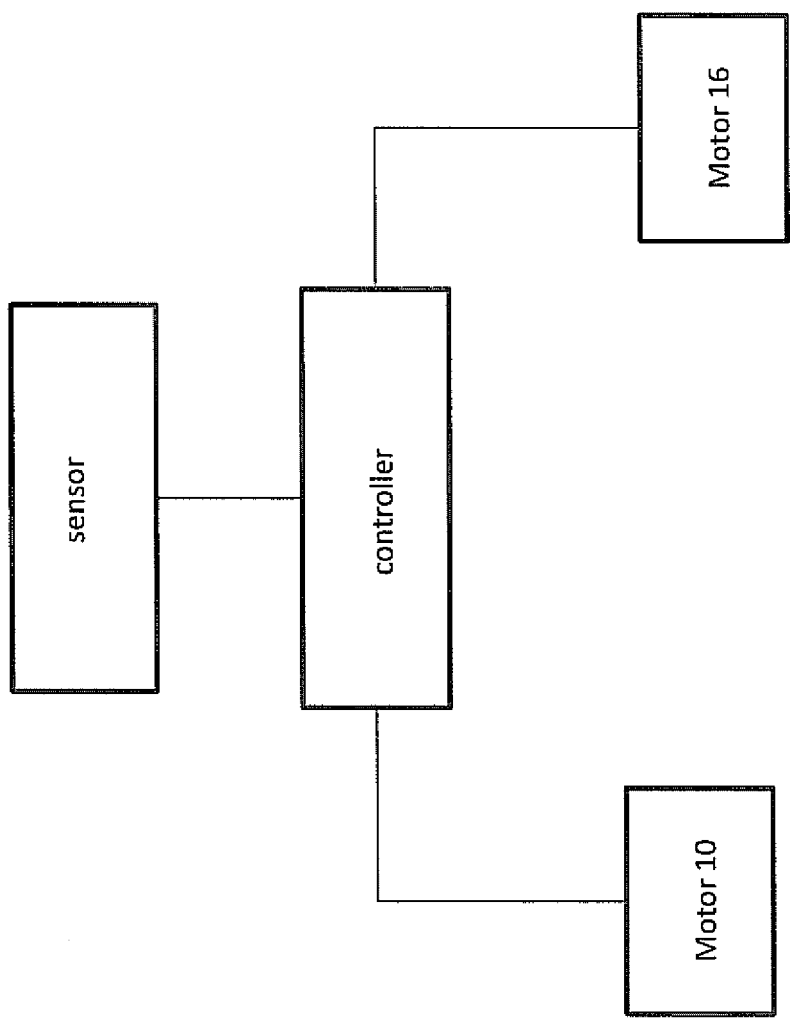
FIG. 22 is a diagram illustrating the sensor connected to a controller controlling the sliding door motors.
Figure 23:
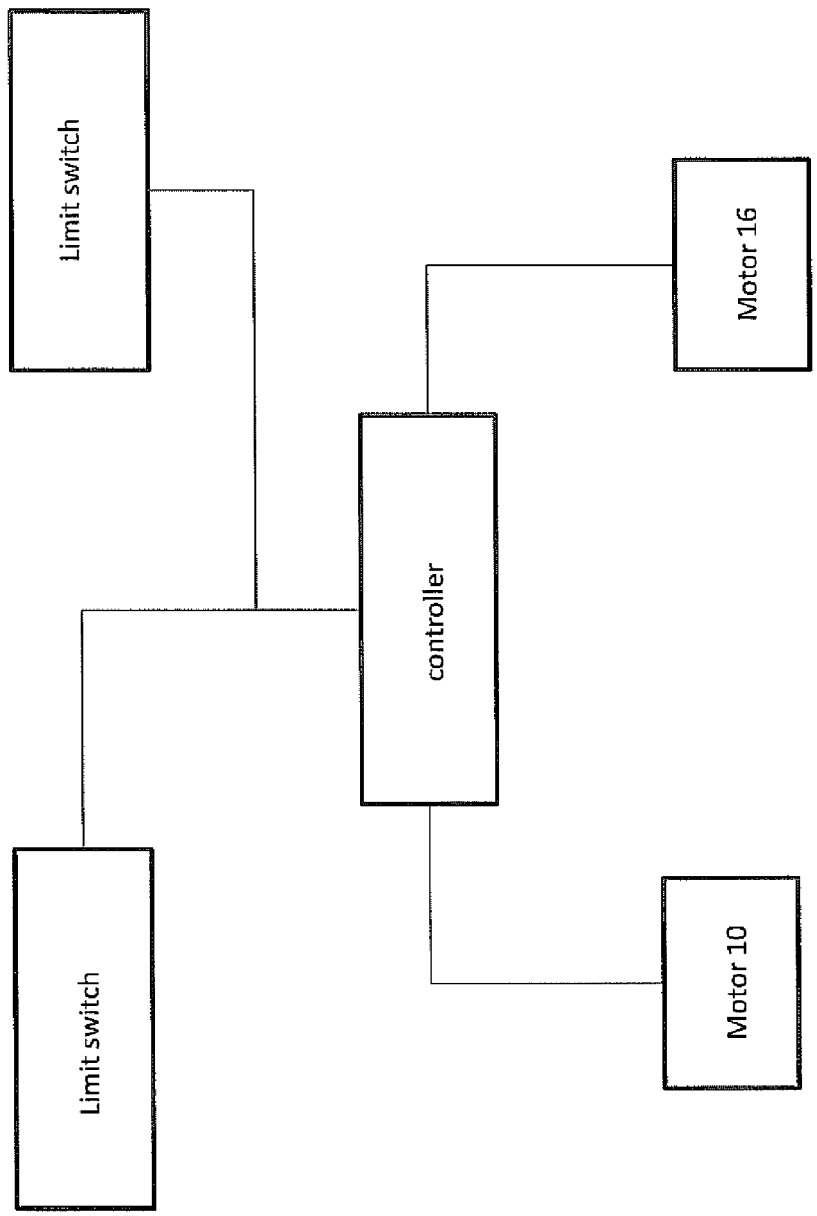
FIG. 23 is a diagram illustrating the limit switches connected to a controller controlling the sliding door motors.
Figure 24:
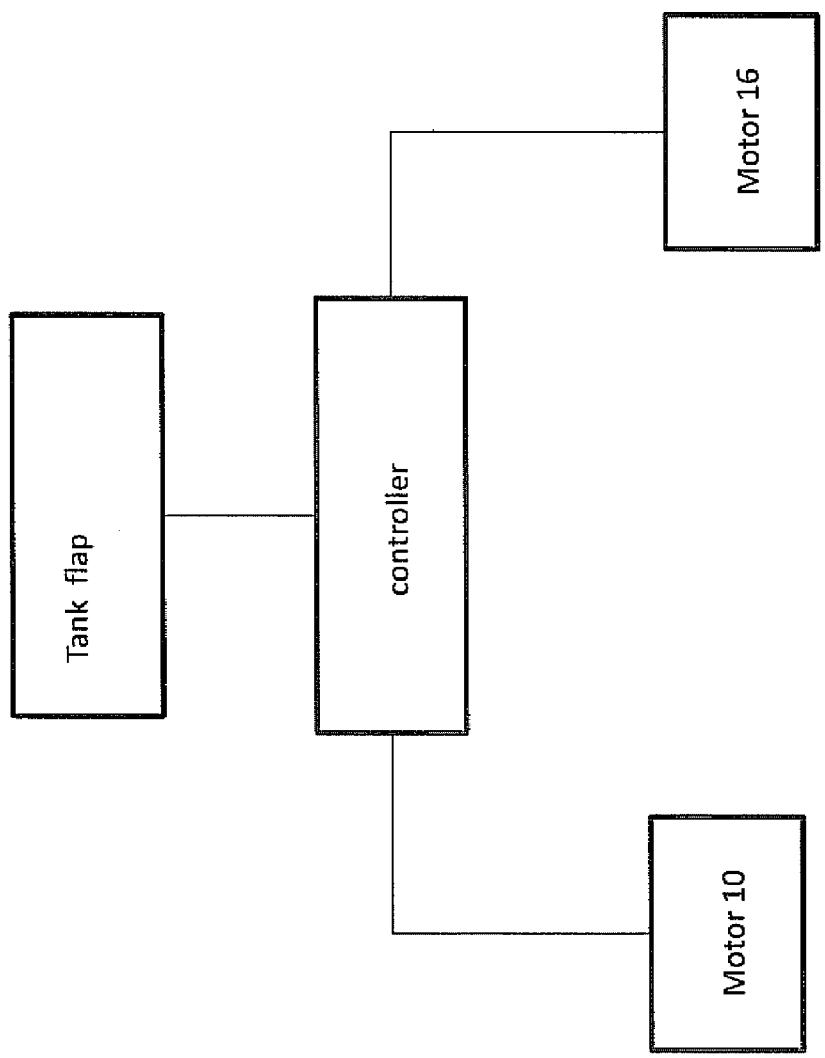
FIG. 24 is a diagram illustrating the tank flap connected to a controller controlling the sliding door motors.
Figure 25:
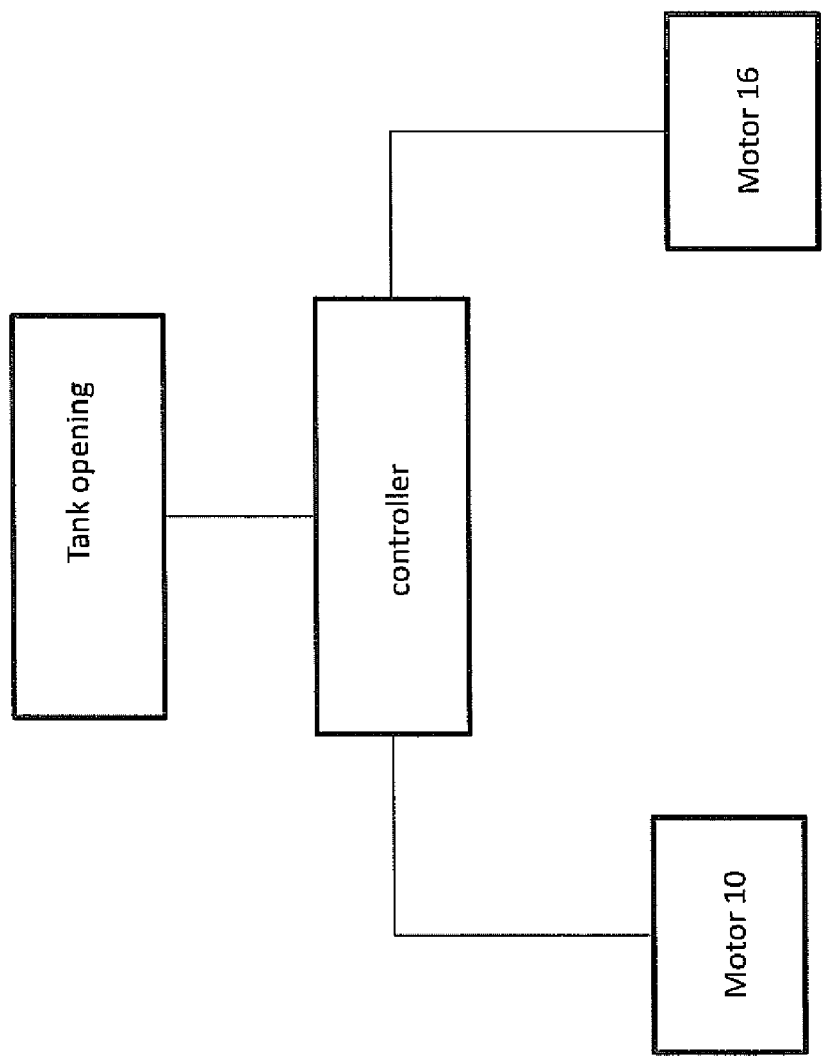
FIG. 25 is a diagram illustrating the tank opening connected to a controller controlling the sliding door motors.
Figure 26:
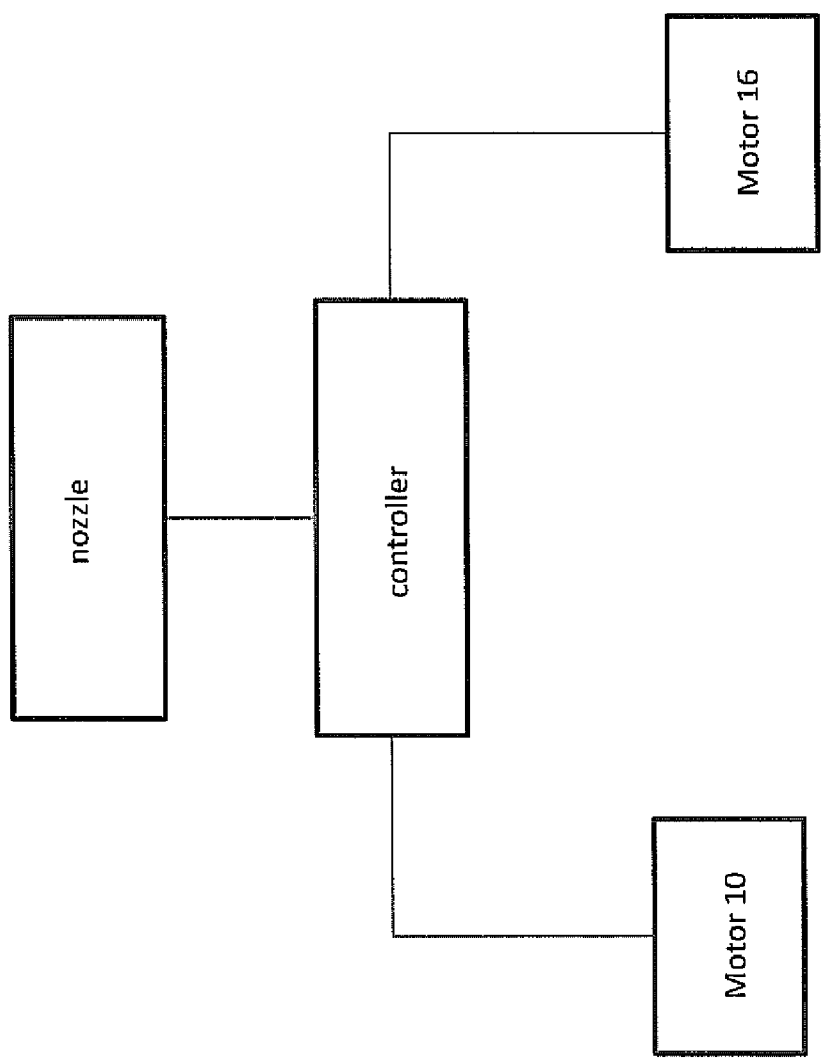
FIG. 26 is a diagram illustrating the nozzle connected to a controller controlling the sliding door motors.

However when the steerable wheels of the motor vehicle, i.e. the front wheels are locked, there is a risk that the sliding door collides with a locked front wheel. In FIG. 19 the front wheels have been locked to the left. The left front wheel 41 protrudes to the left over the vehicle body. As is evident from FIG. 19 the left front wheel 41 has been locked to the left so far that the sliding door in the completely opened position according to FIG. 18 would collide with the front wheel 41.

To prevent this, the wheel lock of the motor vehicle can be established in terms of direction and extent by an angle of rotation sensor for the drag link of the motor vehicle. The opening of the sliding door 1 can be limited as a function of the wheel lock established. As is evident from FIG. 19 the opening movement of the sliding door 1 opens before the sliding door has reached the completely open position according to FIG. 18. FIG. 19 shows the opened end position of the sliding door 1 with front wheels locked to the left.

The invention makes possible the detection of the lock angle to detect the freedom from obstacles of automatic sliding door opening. It makes possible preventing a collision of the sliding door with the front wheel or steered wheel of a vehicle provided with an automatic sliding door opening. However, the detection of the angle of rotation can also take place by means of at least two limit switches that can be actuatable by cams. Processing of the angle information is effected through suitable hardware and software. According to the angle information the door is opened parallel to the vehicle (FIG. 18), or in accordance with the wheel protrusion, at an angle to the vehicle (FIG. 19). The invention makes possible operating the sliding door on the vehicle with the least possible distance to the body. It makes possible realising a sliding door on vehicles with variable outer contours, more preferably on vehicles with sliding doors opening towards the front.

In a corresponding manner more preferably the rear doors of a vehicle can be protected from colliding with a tank flap and/or with a nozzle. The door movement and/or door position of the front door can be adapted to the wheel position of the front wheels. The door movement and/or door position of the rear door can be adapted to external obstacles such as more preferably an opened tank flap and/or a nozzle. The wheel position and/or obstacles and/or vehicle states can be detected through suitable sensors. However, vehicle information systems, more preferably the vehicle's own bus system are suitable for detection. The information concerning one or several vehicle states can be processed through hardware and software and converted into an adapted movement profile.

With the embodiment according to FIG. 16 to 19 the deflection guide 29 and/or the lock guide 30 and the associated components in each case can be designed so that the shown movement sequence is obtained.

While the invention has been illustrated in the foregoing description, the same is to be considered as illustrative and not restrictive in character. Therefore, it should be understood that only the preferred embodiments have been shown and described fully and that all changes and modifications that come within the spirit and scope of the claimed invention are desired to be protected.

What is claimed is:

1. A sliding door assembly for a vehicle comprising:
   a door;
   a slide;
   a guide rail longitudinally displaced about the door and adapted to receive the slide;
   a vehicle mount;
   a hinge shackle swivel mounted between the slide and the vehicle mount, the hinge shackle swiveling and causing the sliding door to be swiveled away or toward a body of the vehicle between a set to position and a position parallel to the body;
   a state quantity of a vehicle, the door having more than one travel path,
   wherein the travel path is based on the state quantity of the vehicle.

2. The sliding door according to claim 1, further including a sensor for establishing the state quantity of the vehicle.

3. The sliding door according to claim 2, wherein the state quantity is a function of an angle of rotation as measured by the sensor for a drag link of the vehicle.

4. The sliding door according to claim 2, wherein the sensor includes two limit switches positioned to sense a steering angle of the vehicle.

5. The sliding door according to claim 1 wherein the state quantity is a function of the position of a wheel lock of the vehicle.

6. The sliding door according to claim 1, wherein the state quantity of the vehicle is a function of the position of a tank flap of the vehicle.

7. The sliding door according to claim 1, wherein the state quantity of the vehicle is a function of a presence of a nozzle in a tank opening of the vehicle.

8. The sliding door according to claim 1, wherein the hinge shackle is swivel mounted to the slide and swivel mounted to the vehicle mount, the rotation of at least one swivel being a function of the state quantity of the vehicle.

9. The sliding door according to claim 1, wherein the door is a front door of the vehicle.

10. The sliding door according to claim 1, further including a motor connected to the hinge shackle in such manner that the hinge shackle can be swiveled based on the state quantity of the vehicle.

11. A method for opening a sliding door of a vehicle comprising:
 establishing a state quantity of a vehicle,
 opening a door, the door including: a slide; a guide rail longitudinally displaced about the door and adapted to receive the slide; a hinge shackle swivel mounted between the slide and the vehicle swiveling and causing the sliding door to be swiveled away or toward a body of the vehicle between a set to position and a position parallel to the, the door having more than one path of travel; and
 establishing the travel of the door based on the state quantity of the vehicle.

12. The method for opening a sliding door of a vehicle of claim 11, wherein one travel path is substantially parallel and one travel path is at an angle to the substantially parallel path.

13. The sliding door according to claim 11, wherein the state quantity is a function of the position of a wheel lock of the vehicle.

14. The sliding door according to claim 11, wherein the state quantity is a function of an angle of rotation as measured by a sensor for a drag link of the vehicle.

15. The sliding door according to claim 11, wherein the state quantity of the vehicle is determined at least in part by two limit switches positioned to sense a steering angle of the vehicle.

16. The sliding door according to claim 11, wherein the state quantity of the vehicle is a function of the position of a tank flap of the vehicle.

17. The sliding door according to claim 11, wherein the state quantity of the vehicle is a function of a presence of a nozzle in a tank opening of the vehicle.

18. The sliding door according to claim 11, wherein the door is a front door of the vehicle.

* * * * *